March 22, 1949.  J. E. COONEN  2,465,148
SKID PLATFORM
Filed Sept. 21, 1944
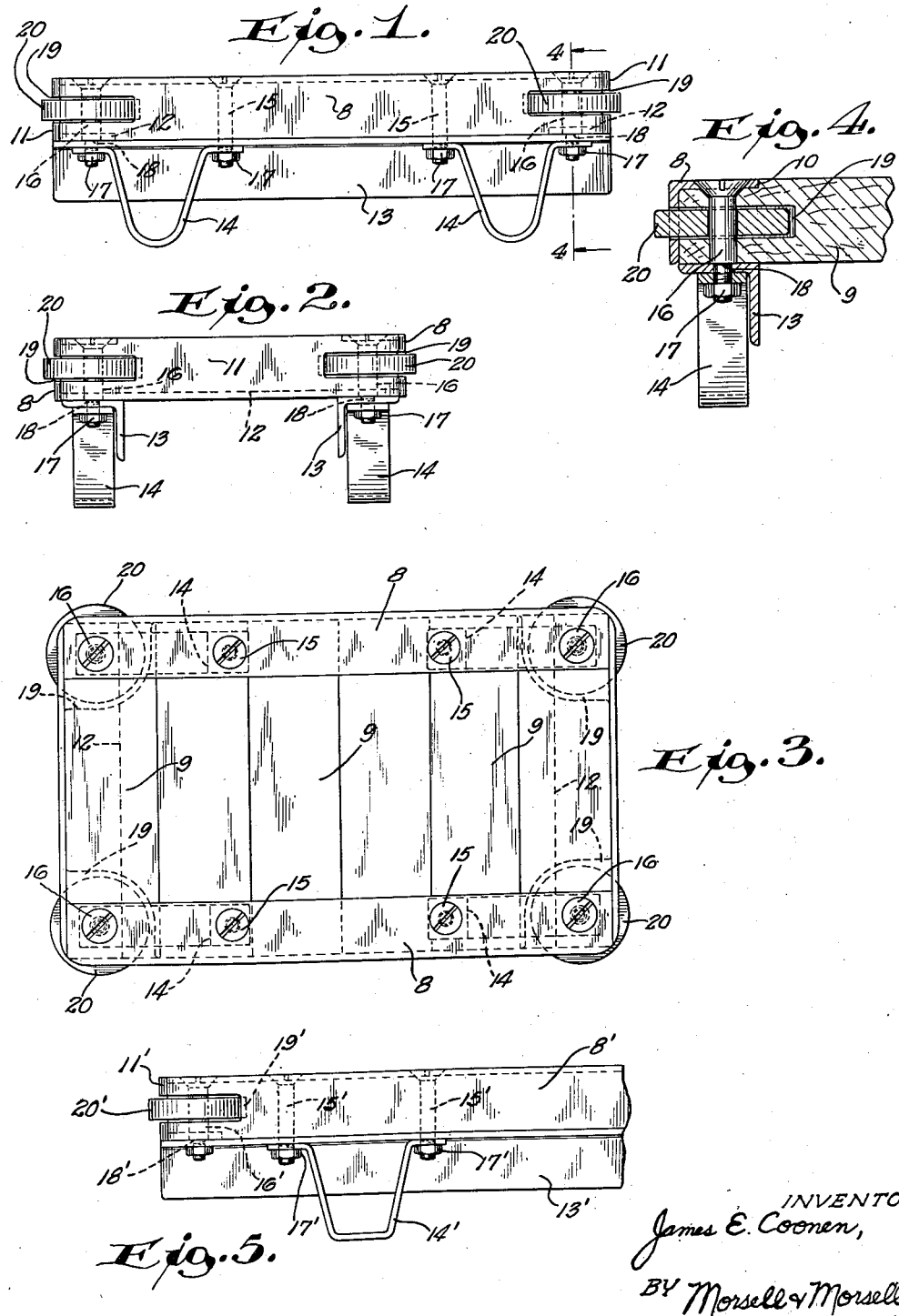
INVENTOR
James E. Coonen,
BY Morsell & Morsell
ATTORNEYS.

Patented Mar. 22, 1949

2,465,148

UNITED STATES PATENT OFFICE 2,465,148

SKID PLATFORM

James E. Coonen, Neenah, Wis.

Application September 21, 1944, Serial No. 555,176

2 Claims. (Cl. 248—120)

This invention relates to improvements in skid platforms, and more particularly to a skid platform provided with wheeled or anti-friction supporting means to permit easy rolling propulsion of the skid platform when it is turned onto an edge.

Skid platforms are customarily used in factories for receiving finished or partially finished products from various machines or assembly lines. After a skid platform has been loaded with such products or material, the skid platform is engaged by a wheeled dolly, whereupon the wheeled dolly, with the loaded skid platform thereon, is pulled away to a storage, unloading, or packing station. After a transferred skid platform has been unloaded, it may be left at the unloading station, or it may be moved to another temporary location, and it is the usual practice to turn unloaded skid platforms onto their side edges. When an unloaded skid platform thus disposed is subsequently to be moved to another point for use, it is the practice to push or slide it along the floor on its side edge until the point of use is reached, whereupon it is again turned to a horizontal position for loading. It is quite inconvenient and difficult to move an unloaded skid platform by sliding it along its edge, and this is particularly true if the floor is rough, or if the side edge of the skid platform is likewise rough.

With the foregoing in mind, it is, therefore, a primary object of the present invention to overcome the difficulties mentioned by providing a skid platform having mounted in its edge portions, wheeled or anti-friction supporting means which come into effective position for easy rolling propulsion of the skid platform only when the skid platform is turned onto a side edge or end.

Skid platforms of the type with which the present invention is concerned, are formed with angle iron, side and end frame members which are apt to be or become relatively rough and sharp. These rough or sharp angle iron frame members of a skid platform present a hazard to the workers who are apt to bodily contact rough or sharp skid edge portions and injure themselves, or their clothing. The skid platform of the present invention contemplates the reduction of this hazard by the mounting of outwardly projecting horizontally disposed rollers or wheels along peripheral portions of the skid platform frame, which outwardly projecting, horizontally disposed rollers or wheels, besides serving as anti-friction means for the propulsion of a skid platform turned onto an edge, serve as smooth protective bumpers or guards when the skid platform is in any position.

A further object of the invention is to provide a skid platform equipped with wheeled or anti-friction supporting means effective for the propulsion of the skid platform when the same is turned onto an edge, obviating the normal practice of sliding a skid platform from place to place, and preventing the floors of the building in which the skid platform is used from being gouged or otherwise damaged or marred, and also saving wear on the edge portions of the skid platform.

In conventional skid platforms, bolts are utilized in the framework, and the flanged upper extremities of supporting legs are connected to portions of the skid platform frame by bolts, the bolts being perpendicular to the plane of the platform. A more specific object of the present invention is to utilize certain of the skid platform bolts mentioned as axes for horizontally disposed rollers or wheels, in addition to the normal functions of said bolts.

A further object of the invention is to provide a skid platform which is very little more expensive to manufacture than a standard skid platform, but which possesses many advantages over the standard skid platform, and may be used with a much greater degree of facility and safety.

A further object of the invention is to provide a skid platform which is of very simple construction, is strong and durable, is easy to manipulate and handle, and is well adapted for the purposes described.

With the above and other objects in view, the invention consists of the improved skid platform, and its parts and combinations, as set forth in the claims, and all equivalents thereof.

In the accompanying drawing, in which the same reference characters indicate the same parts in all of the views:

Fig. 1 is a side view of the improved skid platform;

Fig. 2 is an end view thereof;

Fig. 3 is a top plan view of the improved skid platform;

Fig. 4 is an enlarged fragmentary, detail, sectional view taken on line 4—4 of Fig. 1; and Fig. 5 is a fragmentary side view of an alternative form of the skid platform showing the manner in which the present improvements are embodied therein.

Referring more particularly to the form of skid platform shown in Figs. 1 to 4, inclusive, it will appear that the skid platform frame comprises a pair of spaced longitudinally extending angle iron members 8 between the depending side flanges of which are extended closely adjacent transverse platform planks 9. The top portions of the planks 9 are recessed, as at 10, to receive the top flanges of the angle iron members 8, providing a flush top surface for the platform. The ends of the frame are closed by transverse angle iron plates 11 whose lower horizontal flanges seat in recesses 12 extending across the bottom surface portions of the end planks 9. Longitudinal angle iron members 13 underlie and are clamped against bottom portions of the planks 9 by means to be referred to hereinafter.

The skid platform portion described, when in normal use, is adapted to be disposed horizontally, and is elevated from the ground or floor by means of a plurality of substantially V-shaped legs 14, whose upper flanged extremities are rigidly secured to the longitudinal angle iron members 13. Some of the securing means for the legs 14 comprise standard screw bolts 15, while the other securing means for the legs comprise modified screw bolts 16. The latter, in the form of the invention shown in Figs. 1 to 4 inclusive, engage the leg flanges adjacent the corners of the platform.

The top flanges of the angle iron members 8 have counter-sunk openings to receive the heads of the bolts 15 and 16 and all of the bolts are perpendicular to the plane of the platform proper and have their shanks extended through certain of the planks and the top flanges of the longitudinal bottom angle iron members 13. The threaded lower extremities of the bolts also pass through openings in the leg flanges and carry nuts 17. Thus, all of the bolts serve to clamp the angle iron members 8 and 13 to opposite faces of the planks 9 and also secure the legs 14 to the composite platform.

The modified bolts 16 heretofore referred to have the major portions of their shanks of substantial diameter. The lower end portions of these bolts 16 are reduced and shouldered as at 18 with said shouldered portions abutting the top surfaces of the bottom longitudinal angle iron members 13 and with the reduced portions of the bolts extending through the top flanges of the angle iron members and through the flanges of the legs 14 close to the ends of the skid platform.

In the form of skid platform shown in Figs. 1 to 4 inclusive, the legs 14 are disposed relatively close to the ends or corner portions of the skid platform, and hence the bolts 16 are disposed relatively close to the platform corners. The platform corners are recessed as at 19 to accommodate rollers or wheels 20. These wheels or rollers 20 are normally horizontally disposed and are revolubly mounted on the enlarged shank portions of the bolts 16, which shank portions serve as axes for the wheels or rollers which are free to revolve in the corner recesses 19. The wheels or rollers 20 are so arranged that their peripheral portions project outwardly of their recesses and beyond the outer walls of the sides and ends of the platform.

The improved skid platform is used in its ordinary manner in a horizontal position, elevated from the floor or ground by the supporting legs 14, and the flat platform or table receives products from machines or assembly lines. When a loaded skid platform is to be transported to another point, a wheeled dolly is engaged thereunder, elevating the skid platform, and the skid platform is transported to another location by the dolly, whereupon it is disengaged from the dolly and emptied. It is the practice to turn empty skid platforms to an angle of 90° from their normal position onto an edge for temporary storage, or for removal to another point. When this is practiced, a pair of wheels or rollers 20 on the side of the skid platform on which the platform is turned, then come into play to provide rolling support for the tilted skid platform to permit its being readily rolled to another location. The rolling propulsion of the skid platform thus afforded, makes the skid platform very easy to move, prevents wear on the edge of the skid platform, and prevents abrasive action with respect to the floor or supporting surface. In any position of the skid platform, the laterally projecting peripheral portions of the wheels or rollers 20 also serve as bumpers or guards to prevent workers from bodily contacting the skid platform.

It is of course appreciated that skid platforms are customarily provided in various sizes, shapes and proportions, depending upon the service to which they are to be put. In skid platforms which are relatively elongated, it is the practice to mount the supporting legs more inwardly from the ends or corners of the platform than is the case with respect to a shorter skid platform of the type illustrated in Figs. 1 to 4 inclusive. Fig. 5 illustrates a relatively long skid platform wherein the supporting legs 14' are somewhat removed from the ends or corners of the platform. When this condition prevails, standard bolts 15' are utilized for the securement of the frame elements and the mounting of the legs 14'. However, adjacent the corner portions of the skid platform which have horizontal recesses 19' formed therein, modified bolts 16' extend through the angle iron members 8' and 13', also passing through the central portions of the recesses 19'. These modified bolts 16', besides serving as connecting means for the frame elements, have their enlarged shank portions serve as axes for wheels 20' in the same manner as in the principal form of the invention.

While several exemplifications of the invention have been shown and described, it should be understood that they are merely by way of illustration, and in its broader aspects, the invention contemplates the application of outwardly projecting wheels or anti-friction supporting means to any desired peripheral portions of the elevated platform or table portion of the skid platform, with the wheels or anti-friction supporting means being inactive in the normal horizontal position of the skid platform but adapted to rollingly support the skid platform when it is turned upright onto an edge provided with the rolling supporting means. It is not essential that the wheel recesses and the wheels or rollers be located at the corners of the skid platform, but in the exemplification illustrated, the arrangement is especially desirable because then, as the platform is turned onto any edge whatsoever, it will nevertheless be supported for rolling propulsion.

From the foregoing description it will be evident that the improved skid platform is of simple and novel construction, is economical to produce, and the construction thereof is such as to facilitate and enhance the normal use of the skid platform.

What is claimed as the invention is:

1. In a skid platform having a normally horizontally disposed flat, quadrilateral table with recesses in all of its corner portions opening into adjacent right angularly related edge portions, the table including a composite frame, rollers mounted in said recesses and each projecting beyond adjacent right angularly related edge portions of the table frame, the plane of the rollers lying in the plane of the table, axes for said rollers extending through portions of the frame and table recesses, said axes also serving as securing members for portions of the composite frame, and legs underlying the frame to normally support the table in a horizontal, elevated position with portions of the legs extending below said recesses, said roller axes additionally aiding in the mounting of the legs on the underside of the frame, said rollers permitting rolling propulsion of the skid platform when it is turned onto any of its edges.

2. In a flat, leg-supported, quadrilateral platform with the platform normally disposed horizontally and elevated from a floor by the legs, anti-friction members movably mounted in at least two diagonally opposite corner portions of the platform and each projecting beyond adjacent right angularly related peripheral portions of the platform and elevated above and out of contact with the floor in the normal position of the platform, said anti-friction members adapted for floor contact to facilitate rolling propulsion of the platform when it is turned onto any edge.

JAMES E. COONEN.

REFERENCES CITED

The following references are of record in the file of this patent:

UNITED STATES PATENTS

| Number | Name | Date |
| --- | --- | --- |
| 970,137 | Thomas | Sept. 13, 1910 |
| 1,575,462 | Stuebing | Mar. 2, 1926 |
| 1,698,029 | Shepard et al. | Jan. 8, 1929 |
| 1,832,770 | Hallowell | Nov. 17, 1931 |